United States Patent
Smith et al.

(10) Patent No.: US 11,904,883 B1
(45) Date of Patent: Feb. 20, 2024

(54) METHOD AND SYSTEM FOR MANAGING INCOMING MESSAGES ON-VEHICLE

(71) Applicant: GM GLOBAL TECHNOLOGY OPERATIONS LLC, Detroit, MI (US)

(72) Inventors: Dustin H. M. Smith, Clarkston, MI (US); Vivek Vijaya Kumar, Shelby Township, MI (US); Mohammad Naserian, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/891,614

(22) Filed: Aug. 19, 2022

(51) Int. Cl.
*B60W 50/14* (2020.01)
*B60W 40/08* (2012.01)

(52) U.S. Cl.
CPC .......... *B60W 50/14* (2013.01); *B60W 40/08* (2013.01); *B60W 2540/22* (2013.01); *B60W 2556/45* (2020.02)

(58) Field of Classification Search
None
See application file for complete search history.

(56) References Cited

U.S. PATENT DOCUMENTS

2015/0367770 A1* 12/2015 Newton-Dunn ........ H04W 4/14
340/438
2018/0164108 A1* 6/2018 Rahal-Arabi ...... G01C 21/3484

* cited by examiner

*Primary Examiner* — Thomas S McCormack
(74) *Attorney, Agent, or Firm* — Quinn IP Law (57) ABSTRACT

A method and system for controlling driver communication includes monitoring, via a plurality of on-vehicle subsystems, a vehicle state, an external environment state, and an in-cabin state via the plurality of on-vehicle subsystems; determining a driver workload score based upon the external environment state, the in-cabin state, and the vehicle state; receiving an incoming message; ranking the incoming message; determining a notification action for the incoming message based upon the driver workload score and the rank of the incoming message; and executing the notification action for the incoming message.

21 Claims, 4 Drawing Sheets

METHOD AND SYSTEM FOR MANAGING INCOMING MESSAGES ON-VEHICLE

INTRODUCTION

Vehicle drivers may be subjected to one or multiple internal and external inputs that may distract their attention during vehicle operation. Furthermore, vehicle operating environments may demand varying levels of driver attentiveness.

SUMMARY

The concepts described herein relate to methods, systems, and analytical techniques for monitoring vehicle operation, an external environment surrounding the vehicle, and an in-cabin state of the vehicle. Notifying a driver of an incoming message may be dynamically controlled based upon an assessment of the importance and/or relevance of the incoming message in view of the vehicle operation, the external environment, and the in-cabin state.

An aspect of the disclosure is a driver communication control system for a vehicle having a communication management controller that is in communication with a telematics communication device, an infotainment system, a vehicle subsystem controller, a cabin sensor, a spatial monitoring system, and a navigation system. The communication management controller includes an instruction set that is executable to monitor, via the vehicle subsystem controller, a vehicle state; monitor, via the spatial monitoring system, the telematics communication device, the navigation system, and an external environment state; and monitor, via the cabin sensor and the infotainment system, an in-cabin state. A driver workload assessment is dynamically determined based upon the external environment state, the in-cabin state, and the vehicle state. An incoming message is received and categorized, and a notification action for the incoming message is determined based upon the driver workload assessment and the categorization of the incoming message. The notification action for the incoming message is then executed.

Another aspect of the disclosure may include the driver workload score being one of no workload, a minimal workload, a moderate workload, a high workload, or a specialty driving workload.

Another aspect of the disclosure may include the driver workload score being an indicator of a magnitude of sensory inputs to the driver and actual or expected driver actions.

Another aspect of the disclosure may include the instruction set being executable to rank the incoming message as one of a critical alert, an important alert, a high maintenance notice, or a predictive maintenance notice.

Another aspect of the disclosure may include the instruction set being executable to rank the incoming message as the critical alert when the incoming message indicates a need to immediately stop the vehicle due an imminent hazard.

Another aspect of the disclosure may include the instruction set being executable to rank the incoming message as the critical alert when the incoming message originates from an approved contact.

Another aspect of the disclosure may include the instruction set being executable to rank the incoming message as the important alert when the incoming message indicates a need to stop the vehicle to prevent vehicle damage.

Another aspect of the disclosure may include the instruction set being executable to rank the incoming message as the important alert when the incoming message indicates a navigation alert indicating a need to discontinue vehicle travel.

Another aspect of the disclosure may include the instruction set being executable to rank the incoming message as the high maintenance notice when the incoming message indicates a need for an important maintenance or repair action.

Another aspect of the disclosure may include the instruction set being executable to rank the incoming message as the predictive maintenance notice when the incoming message indicates a need for routine maintenance.

Another aspect of the disclosure may include the instruction set being executable to execute the notification action to communicate the incoming message to the driver only when the rank of the incoming message is equal to or greater than the driver workload score.

Another aspect of the disclosure may include the instruction set being executable to execute the notification action to block communication of the incoming message to the driver until the driver workload score decreases to a level that is equal to or less than the rank of the incoming message.

Another aspect of the disclosure may include the vehicle subsystem controller being a controller included in one of a steering subsystem, a braking subsystem, a drivetrain subsystem, a stability control system, or an advanced driver assistance system (ADAS).

Another aspect of the disclosure may include a communication control system for a vehicle that includes a communication management controller in communication with a plurality of on-vehicle subsystems. The communication management controller includes an instruction set that is executable to monitor a vehicle state, an external environment state, and an in-cabin state via the plurality of on-vehicle subsystems, dynamically determine a driver workload score based upon the external environment state, the in-cabin state, and the vehicle state, receive an incoming message, rank the incoming message, determine a notification action for the incoming message based upon the driver workload score and the rank of the incoming message, and execute the notification action for the incoming message.

Another aspect of the disclosure may include a method for controlling driver communication in a vehicle that includes monitoring, via a plurality of on-vehicle subsystems, a vehicle state, an external environment state, and an in-cabin state; determining a driver workload score based upon the external environment state, the in-cabin state, and the vehicle state; receiving an incoming message; ranking the incoming message; determining a notification action for the incoming message based upon the driver workload score and the rank of the incoming message; and executing the notification action for the incoming message.

Another aspect of the disclosure may include communicating the incoming message to the driver only when a rank of the incoming message is equal to or greater than the driver workload score; and blocking communication of the incoming message to the driver until the driver workload score decreases to a level that is equal to or less than the rank of the incoming message.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. Exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, the embodiments may be practiced in conjunction with any number of mechanical and/or electronic systems, and that the vehicle systems described herein are merely embodiment of possible implementations.

The use of ordinals such as first, second and third does not necessarily imply a ranked sense of order, but rather may only distinguish between multiple instances of an act or structure.

Human mental processing performance may decrease due to multi-tasking, with even seemingly simple tasks causing driver errors. When two tasks are presented in close temporal proximity, there may be a decrease in human attention performance resulting in delayed responsiveness, referred to as psychological refractory period phenomenon. By way of a non-limiting example, a reaction time to a well-established task such as pressing a brake pedal when a lead car's brake lights illuminate, may be delayed by over one second when a second task stimulus is presented in close synchrony.

The concepts described herein provide a system and method to rank-order incoming messages by dynamically determining a driver workload score based upon information from an external environment, an in-cabin state, and vehicle operation, and determine a notification action for an incoming message based upon the driver workload score and a rank of the incoming message.

Figure 1:
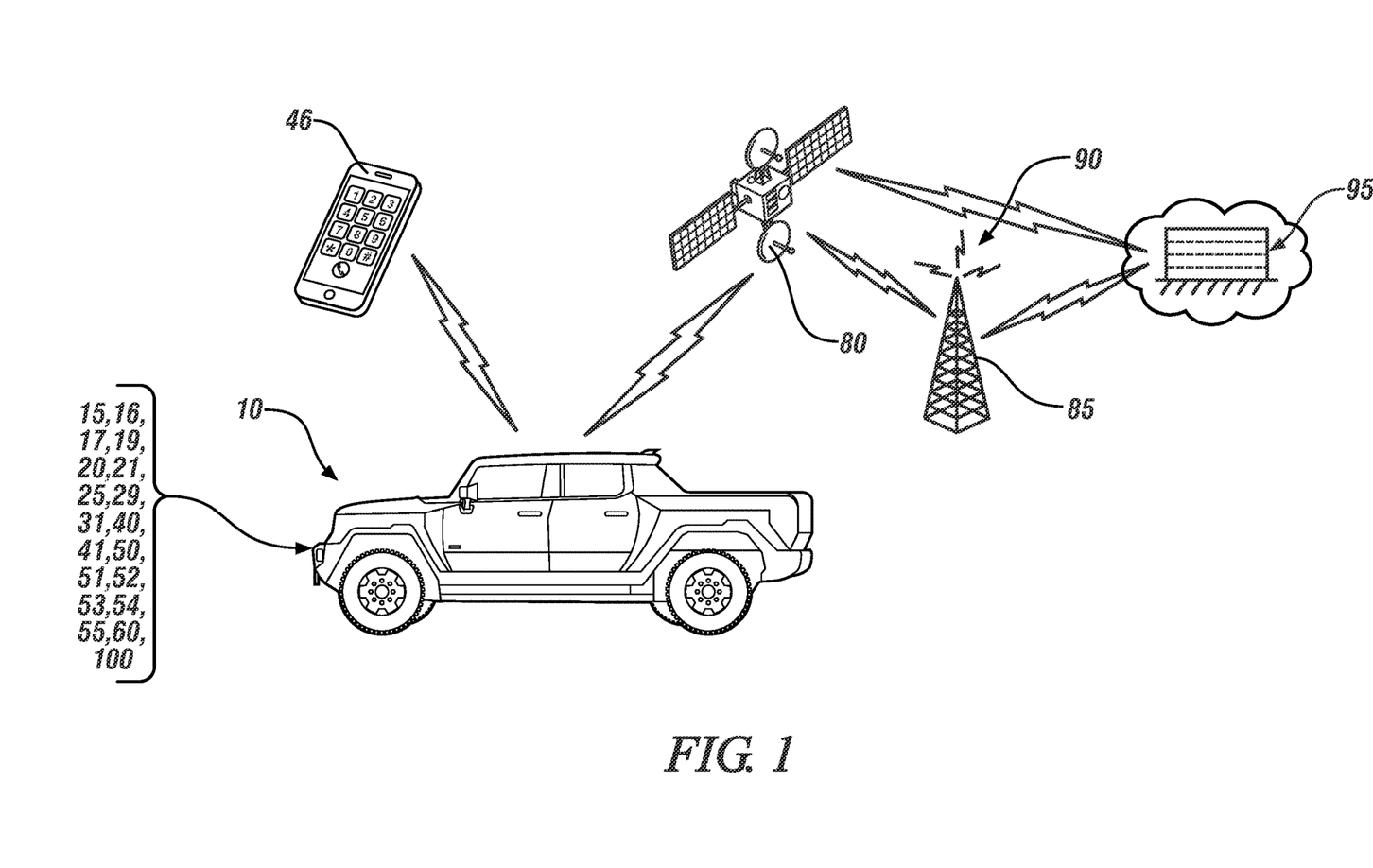
FIG. 1 schematically illustrates a vehicle and associated vehicle subsystems, in accordance with the disclosure.
Figure 2:
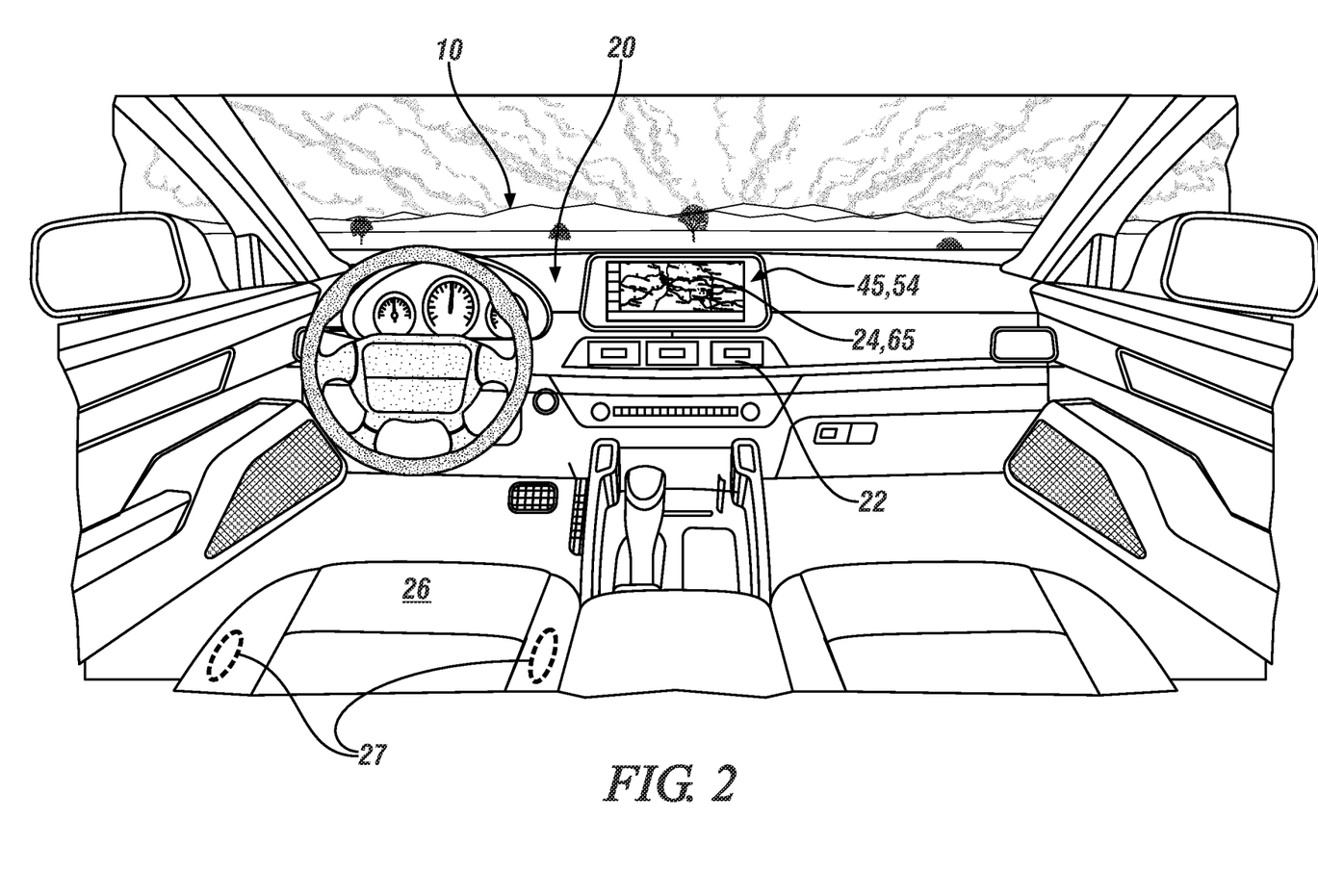
FIG. 2 schematically illustrates a vehicle cabin, in accordance with the disclosure.

Referring to the drawings, wherein like reference numerals correspond to like or similar components throughout the several Figures, FIGS. 1 and 2 schematically illustrate details related to a vehicle 10 and vehicle cabin 20 that include a driver communication control system 100 having a first controller 15 that is in communication with a telematics device 60, an infotainment system 21, a plurality of vehicle subsystems and associated controllers, a plurality of cabin sensors, a spatial monitoring system 41, and a navigation system 55. As detailed with reference to FIGS. 3 and 4, the first controller 15 is a communication management controller with an instruction set 16 that is executable to monitor one or more vehicle states, one or more external environment states, and one or more in-cabin states. A driver workload assessment is dynamically determined based upon the external environment states, the in-cabin states, and the vehicle states. An incoming message is received and categorized, and a notification action for the incoming message is determined based upon the driver workload assessment and the categorization of the incoming message. The notification action for the incoming message is then executed. Notifying a driver of an incoming message may be dynamically controlled based upon an assessment of the importance and/or relevance of the incoming message in view of the vehicle operation, the external environment, and the in-cabin environment.

Referring again to FIG. 1, the vehicle 10 includes a plurality of subsystems and associated controllers. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The vehicle subsystems include, by way of non-limiting examples, a drivetrain system 17 including a controller, a braking system 19 including a braking controller, a steering system 25 for controlling direction of the steerable wheels and steering controller, a climate control system 29 that includes a heating-ventilation-air-conditioning (HVAC) compressor and fan system and HVAC controller. The vehicle 10 may include a stability control system 31 that includes controllable suspension actuators and a stability controller. The vehicle subsystems may further include an advanced driver assistance system (ADAS) 40 that includes an ADAS controller.

Vehicle parameters may be determined from sensor measurements, estimates, and perceptions received by a sensor system in the form of an inertial measurement unit (IMU) 51, which communicates with the stability control system 31. Non-limiting examples of vehicle parameters include longitudinal acceleration, lateral acceleration, yaw rate, steering wheel angle, individual wheel speeds, longitudinal velocity, lateral velocity, tire forces (lateral, normal), vehicle mass, road surface coefficient, road upcoming curvature, and upcoming road obstacles.

The spatial monitoring system 41 includes one or a plurality of spatial sensors and a spatial monitoring controller. Each of the spatial sensors is disposed on-vehicle to monitor all or a portion of the viewable region to detect proximate remote objects such as road features, lane markers, buildings, pedestrians, road signs, traffic control lights and signs, other vehicles, and geographic features that are proximal to the target vehicle 10. The spatial sensors may include a radar sensor, one or multiple cameras, a LiDAR sensor, and/or another sensor. The spatial monitoring controller generates digital representations of the viewable region based upon data inputs from the spatial sensors. The spatial monitoring controller includes executable code to evaluate inputs from the spatial sensors to determine a linear range, relative speed, and trajectory of the vehicle 10 in view of each proximate remote object. The spatial sensors can be located at various locations on the vehicle 10 including the front corners, rear corners, rear sides and mid-sides.

The vehicle 10 has a first plurality of sensors 50, which includes sensors that are arranged to dynamically monitor on-vehicle operating conditions, including, e.g., vehicle speed, acceleration, braking, steering angle, yaw rate, tire pressures, vehicle mass, presence of a trailer, battery state of charge (SOC), driver requests, etc. The first plurality of sensors 50 includes a global positioning system (GPS) sensor 53 and the inertial measurement unit (IU) 51. The IMU 51 is an electronic device that employs one or more of a combination of accelerometers, gyroscopes, and magnetometers that are arranged to measure and report vehicle dynamics parameters such as specific force, angular rate, yaw, and orientation of the vehicle 10. The first plurality of sensors 50 are employed to monitor the vehicle state 320 that is described with reference to FIG. 4.

The vehicle 10 has a second plurality of sensors 52, which includes sensors that are arranged to dynamically monitor ambient environmental conditions including, e.g., elevation, ambient pressure, ambient temperature, humidity (dew point), precipitation, time-of-day, solar load, etc. Alternatively, or in addition, a portion of the ambient environmental conditions may be obtained by connectivity to a proximal weather station or other vehicles employing using communications via the telematics system 60. The second plurality of sensors 52 includes the sensors associated with the spatial monitoring system 41 that are arranged to provide spatial monitoring proximal to the subject vehicle 10. The second plurality of sensors 52 are employed to monitor the external environment 310 that is described with reference to FIG. 4.

Referring again to FIG. 2, a portion of the passenger cabin 20 is illustrated and includes an infotainment system 21 that includes a stereo audio system 22 and a visual display system 24, which may be an element of a human/machine interface (HMI) system 65. The passenger cabin includes a driver's seat 26, which may include a plurality of haptic devices 27 in one embodiment. Other elements may include, in one or more embodiments, a control device for the advanced driver assistance system (ADAS) 40, a human/machine interface (HMI) system 65, and a telematics device 60. The visual display system 24 includes the HMI system 65, one or more of a driver information center, a head-up display, vehicle interior lighting, left and right sideview mirrors, a rear-view mirror, etc.

Referring again to FIG. 1, the vehicle 10 has a third plurality of sensors 54 that monitor the passenger cabin 20. In one embodiment, the third plurality of sensors 54 includes a microphone 45 that is arranged to monitor audible sound within the interior of the target vehicle 10. The visual display system 24 includes one or more of a driver information center, a head-up display, vehicle interior lighting, left and right sideview mirrors, a rear-view mirror, etc. The third plurality of sensors 54 are employed to monitor the in-cabin state 330 that is described with reference to FIG. 4.

The telematics device 60 includes a wireless telematics communication system capable of extra-vehicle communications, including communicating with a communication network system having wireless and wired communication capabilities. The telematics device 60 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively, or in addition, the telematics device 60 has a wireless telematics communication system capable of short-range wireless communication to the handheld device 46, e.g., a cell phone, a satellite phone or another telephonic device. In one embodiment the handheld device 46 is loaded with a software application that includes a wireless protocol to communicate with the telematics device 60 to effect identification of the vehicle driver. In one embodiment, the handheld device 46 executes the extra-vehicle communication, including communicating with an off-board server 95 via a communication network 90 including a satellite 80, an antenna 85, and/or another communication mode. Alternatively, or in addition, the telematics device 60 executes the extra-vehicle communication directly by communicating with the off-board server 95 via the communication network 90. In one embodiment, the off-board server 95 is cloud-based.

The navigation system 55 may include a computer-readable storage device or media (memory) that includes a digitized roadway map, the GPS sensor 53, and a human/machine interface (HMI) device 65 for interacting with and operating the navigation system 55. The GPS sensor 53 generates a set of parameters corresponding to vehicle velocity, geospatial position, and vehicle heading.

Figure 3:
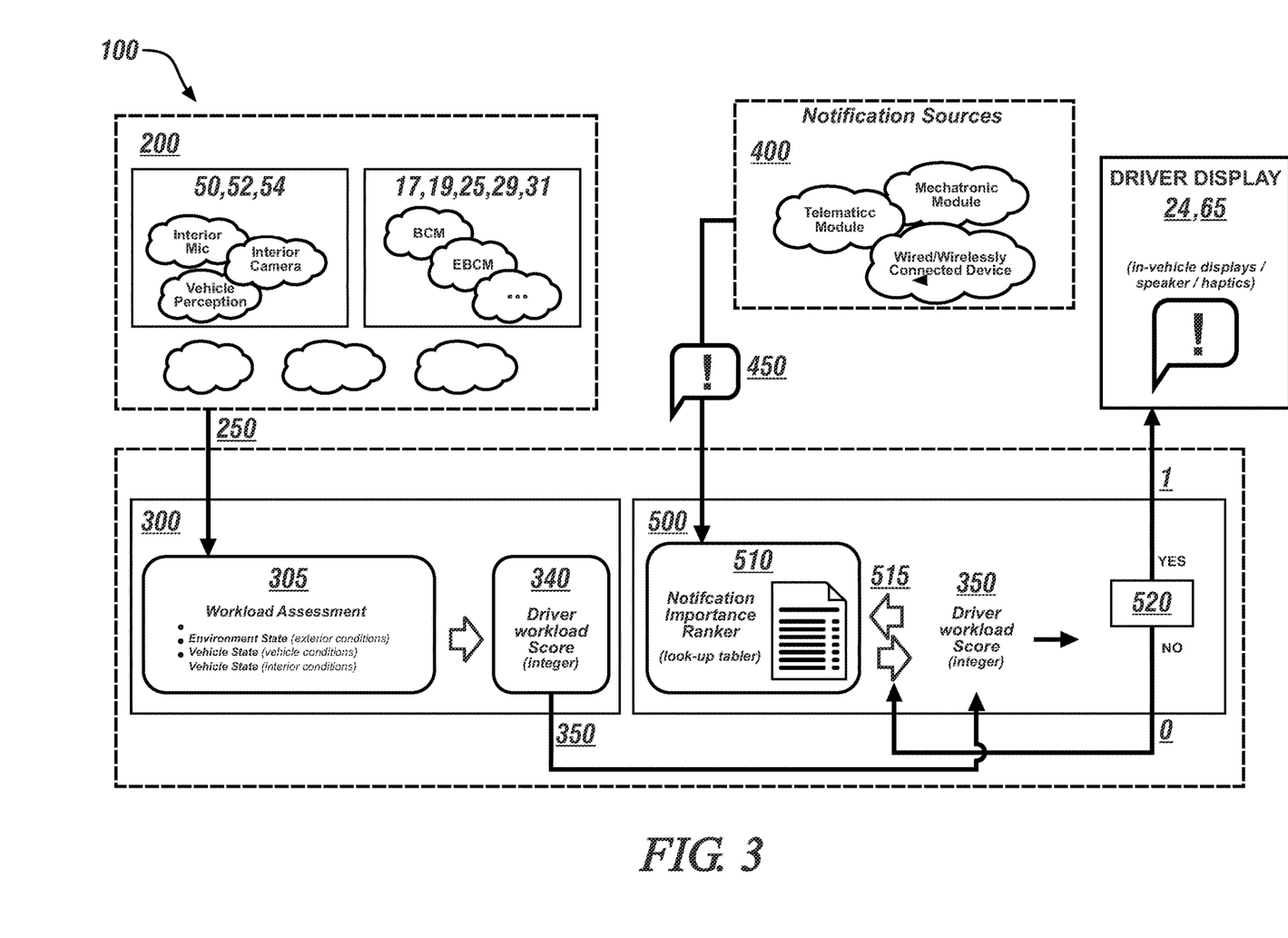
FIGS. 3 and 4 schematically illustrate aspects of a driver communication control system for a vehicle, in accordance with the disclosure.
Figure 4:
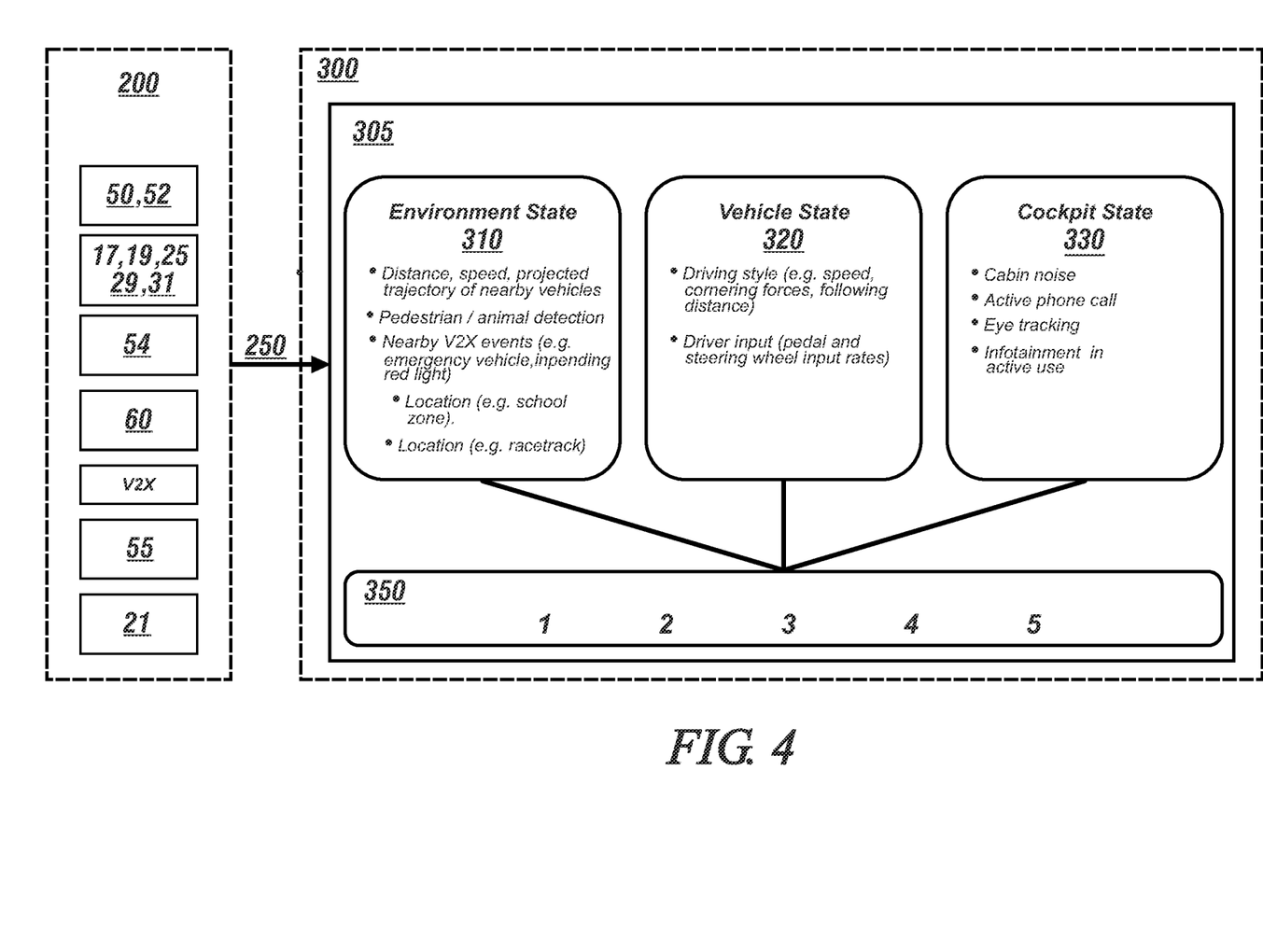

FIGS. 3 and 4 schematically illustrate details related to the communication control system 100 referenced in FIGS. 1 and 2 to receive an incoming message 450, categorize and rank the incoming message 450 (Incoming Message Ranking Routine 510), and determine a notification action for the incoming message (Notification Action Routine 520) based upon the driver workload score and the categorization of the incoming message. The communication control system 100 includes a driver workload estimation routine 300 and a communication allowance routine 500.

Referring now to FIG. 4, with continued reference to FIGS. 1, 2, and 3, the driver workload estimation routine 300 is schematically illustrated, including capturing and compiling driver workload estimation data 250 via a workload estimation routine 200 to determine a driver workload score 350. The driver workload is dynamically assessed based on sensor and data input rules that identify scenarios that may involve driver attention, including, e.g., vehicle speed, following distance, distance to car behind, trajectory of vehicle in adjacent lane, braking event from lead car, traffic density, presence of a V2V event ahead, impending red light (GLOSA) (green light optimization), nearby emergency vehicle, construction zone, school zone, active track racing, pedestrian detection, animal detection, brake/throttle input, steering wheel input, eye tracking, in-cabin noise, active phone call, and active ADAS. The driver workload score 350 indicates a magnitude of sensory inputs to the driver and actual or expected driver actions to gauge the driver's ability to receive additional information. Stated another way, the driver workload score 350 provides an indicator of a magnitude of sensory inputs to the driver and actual or expected driver actions to gauge the driver's ability to tolerate another distraction in the form of an input message.

The driver workload estimation data 250 includes inputs from the first plurality of sensors 50, which includes sensors that are arranged to dynamically monitor on-vehicle operating conditions, including the various subsystems described herein.

The driver workload estimation data 250 includes inputs from the second plurality of sensors 52, which includes sensors that are arranged to dynamically monitor ambient environmental conditions.

The driver workload estimation data 250 includes inputs from the third plurality of sensors 54 that monitor the passenger cabin 20, including the infotainment system 21, as described with reference to FIG. 2.

The driver workload estimation data 250 includes inputs from the telematics device 60 that is capable of extra-vehicle communications, including V2V, V2x, or other communication medium, including infrastructure information such as traffic levels, traffic lights, etc.

The driver workload estimation data 250 includes inputs from the navigation system 55, which includes vehicle location.

The driver workload estimation routine 305 categorizes the foregoing driver workload estimation data 250 to determine an external environment state 310, a vehicle state 320, and an in-cabin state 330.

The external environment state 310 includes, e.g., distances, speeds, trajectories, etc. of nearby vehicles; presence and location of pedestrians, animals, bikes, and other slow moving elements; V2X events such as presence of an emergency vehicle or an impending red traffic light; specialized traffic zoning such as a time-specific school zone or a construction zone; and vehicle location such as a public highway or a closed track.

The vehicle state 320 includes, e.g., vehicle driving style including speed, cornering forces, acceleration/braking, following distances; driver inputs to an accelerator pedal, a brake pedal, a steering wheel, etc. The first plurality of sensors 50 are employed to monitor the vehicle state 320.

The in-cabin state 330 includes, e.g., cabin ambient noise, active phone call, eye tracking, usage of the infotainment system, etc.

The driver workload factor routine 340 compiles the external environment state 310, the vehicle state 320, and the in-cabin state 330 to dynamically determine a driver workload score 350, which is an integer between 1 and 5 in one embodiment, with a driver workload score of 1 indicating no driver workload, and progressively increasing to a driver workload score of 5 as the driver workload increases to a maximum state.

Referring again to FIG. 3, the communication allowance routine 500 includes the incoming message ranking routine 510 and the notification action routine 520.

The incoming message ranking routine 510 evaluates the incoming message 450, including evaluating the source of the incoming message 450 (Notification Sources 400). The source of the incoming message 450 may be internal to or associated with operation of the vehicle 10, e.g., related to one or more of the vehicle states.

The source of the incoming message 450 may be internal to or associated with one or more in-cabin states.

The source of the incoming message 450 may be related to one or more external environment states.

The incoming message ranking routine 510 ranks the incoming message 450 as one of a critical alert with a rank of 4, an important alert with a rank of 3, a high maintenance notice with a rank of 2, or a predictive maintenance notice with a rank of 1, based upon numerous criteria.

The incoming message 450 is identified as a critical alert with a rank of 4 when the source of the incoming message 450 indicates a need to immediately stop the vehicle 10 due an imminent hazard, or when the source of the incoming message 450 is an approved contact, such as an ICE (In Case of Emergency) contact.

The incoming message 450 is identified as an important alert with a rank of 3 when the source of the incoming message 450 indicates a need to stop the vehicle 10 to prevent further vehicle damage, e.g., a low tire pressure, or a navigation alert, or another alert indicating a need to discontinue vehicle travel.

The incoming message 450 is identified as an important maintenance notice with a rank of 2 when the source of the incoming message 450 indicates a need for an important maintenance or repair action, such as a "Check Engine Light" or a "Service Vehicle Soon", or when the incoming message 450 is an incoming call from a non-ICE contact.

The incoming message 450 is identified as a predictive maintenance notice with a rank of 1, when the source of the incoming message 450 indicates a need for routine maintenance, such as a low wiper fluid alert, or an entertainment alert.

The Notification Action Routine 520 compares the rank 515 of the incoming message 450 with the driver workload score 350 to determine an appropriate action.

When the rank 515 of the incoming message 450 is equal to or greater than the driver workload score 350 (1), the communication allowance routine 500 communicates the incoming message 450 to the driver.

When the rank 515 of the incoming message 450 is less than the driver workload score 350 (0), the communication allowance routine 500 blocks any communication of the incoming message 450 to the driver. Instead, the communication allowance routine 500 waits until the driver workload score 350 decreases to an allowable level to communicate the incoming message 450 to the driver.

Thus, when the incoming message 450 is identified as a predictive maintenance notice, the communication allowance routine 500 communicates the incoming message 450 to the driver only when the driver workload score 350 is 1 (indicating minimal or no driver workload).

Thus, when the incoming message 450 is identified as an important maintenance notice, the communication allowance routine 500 communicates the incoming message 450 to the driver only when the driver workload score 350 is 2 (indicating a low driver workload).

Thus, when the incoming message 450 is identified as an important alert, the communication allowance routine 500 communicates the incoming message 450 to the driver only when the driver workload score 350 is 3 (indicating a moderate driver workload).

Thus, when the incoming message 450 is identified as a critical alert, the communication allowance routine 500 communicates the incoming message 450 to the driver under any circumstances when the driver workload score 350 is 4 or 5 (indicating heavy driver workload).

The concepts described herein provide a system and method, executed in the form of a software algorithm, to rank-order a driver workload in terms of a distraction level. Asynchronous notifications, e.g., messages, notices, alarms and alerts are also categorized in a rank-order of importance. With driver workload and notifications being rank-ordered, a software ruleset matrix allows the infotainment software to delay the presentation of notifications until the assessed workload falls to a level that's acceptable for a notification to be shown. A notification can be shown when acceptable indicating any non-persistent notification states that were previously inhibited. The software algorithms incorporate real-time vehicle data to maintain a dynamic assessment of the driver's distraction level, and use this assessment to proactively hold back asynchronous content to reduce distractions and related effects.

The term "controller" and related terms such as microcontroller, control, control unit, processor, etc., refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of digital data storage mediums including memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process.

As used herein, the terms 'dynamic', 'dynamically' and related terms describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including an instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A communication control system for a vehicle, comprising:
   a communication management controller in communication with each of: a telematics communication device, an infotainment system, a vehicle subsystem controller, a cabin sensor, a spatial monitoring system, and a navigation system;
   wherein the communication management controller includes an instruction set, the instruction set being executable to:
   monitor a vehicle state via the vehicle subsystem controller, monitor an external environment state via the spatial monitoring system, the telematics communication device, and the navigation system, monitor an in-cabin state via the cabin sensor and the infotainment system, dynamically determine a driver workload score based upon the external environment state, the in-cabin state, and the vehicle state, receive an incoming message, rank the incoming message, determine a notification action for the incoming message based upon the driver workload score and the rank of the incoming message, and execute the notification action for the incoming message.

2. The communication control system of claim 1, wherein the driver workload score comprises one of no workload, a minimal workload, a moderate workload, a high workload, or a specialty driving workload.

3. The communication control system of claim 1, the driver workload score comprises an indicator of a magnitude of sensory inputs to the driver and actual or expected driver actions.

4. The communication control system of claim 1, wherein the instruction set is executable to rank the incoming message as one of a critical alert, an important alert, a high maintenance notice, or a predictive maintenance notice.

5. The communication control system of claim 4, wherein the instruction set is executable to rank the incoming message as the critical alert when the incoming message indicates a need to immediately stop the vehicle due to an imminent hazard.

6. The communication control system of claim 4, wherein the instruction set is executable to rank the incoming message as the critical alert when the incoming message originates from an approved contact.

7. The communication control system of claim 4, wherein the instruction set is executable to rank the incoming message as the important alert when the incoming message indicates a need to stop the vehicle to prevent vehicle damage.

8. The communication control system of claim 4, wherein the instruction set is executable to rank the incoming message as the important alert when the incoming message indicates a navigation alert indicating a need to discontinue vehicle travel.

9. The communication control system of claim 4, wherein the instruction set is executable to rank the incoming message as the high maintenance notice when the incoming message indicates a need for an important maintenance or repair action.

10. The communication control system of claim 4, wherein the instruction set is executable to rank the incoming message as the predictive maintenance notice when the incoming message indicates a need for routine maintenance.

11. The communication control system of claim 1, wherein the instruction set is executable to execute the notification action to communicate the incoming message to the driver only when the rank of the incoming message is equal to or greater than the driver workload score.

12. The communication control system of claim 1, wherein the instruction set is executable to execute the notification action to block communication of the incoming message to the driver until the driver workload score decreases to a level that is equal to or less than the rank of the incoming message.

13. The communication control system of claim 1, wherein the vehicle subsystem controller comprises a controller included in one of a steering subsystem, a braking subsystem, a drivetrain subsystem, a stability control system, or an advanced driver assistance system (ADAS).

14. The communication control system of claim 4, wherein the instruction set is executable to rank the incoming message as predictive maintenance when the incoming message is a low wiper fluid alert.

15. The communication control system of claim 4, wherein the instruction set is executable to rank the incoming message as predictive maintenance when the incoming message is an entertainment alert.

16. The communication control system of claim 4, wherein the instruction set is executable to rank the incoming message as predictive maintenance when the incoming message originates from a non-ICE (In Case of Emergency) contact.

17. A communication control system for a vehicle, comprising:

a communication management controller in communication with each of: a telematics communication device, an infotainment system, a vehicle subsystem controller, a cabin sensor, a spatial monitoring system, and a navigation system;

wherein the vehicle subsystem controller is in communication with the spatial monitoring system and the navigation system; and wherein the communication management controller includes an instruction set, the instruction set being executable to:

monitor a vehicle state via the vehicle subsystem controller, monitor an external environment state via the spatial monitoring system, the telematics communication device, and the navigation system, monitor an in-cabin state via the cabin sensor and the infotainment system, dynamically determine a driver workload score based upon the external environment state, the in-cabin state, and the vehicle state, receive an incoming message, rank the incoming message, determine a notification action for the incoming message based upon the driver workload score and the rank of the incoming message, and execute the notification action for the incoming message.

18. The communication control system of claim 17, wherein the spatial monitoring system comprises a spatial sensor and a spatial monitoring controller.

19. The communication control system of claim 17, wherein the spatial sensor comprises one of a radar sensor, a camera, or a LiDAR sensor.

20. The communication control system of claim 17, wherein the cabin sensor comprises a microphone.

21. The communication control system of claim 17, further comprising the vehicle subsystem controller being in communication with one of a drivetrain system, a steering system, or a braking system.

* * * * *